(12) United States Patent
Rasmussen et al.

(10) Patent No.: US 10,027,864 B2
(45) Date of Patent: Jul. 17, 2018

(54) OPTICAL ASSEMBLY AND METHOD FOR MANUFACTURING SAME

(71) Applicant: e.solutions GmbH, Ingolstadt (DE)

(72) Inventors: Jens Rasmussen, Ulm (DE); Stefan Christmann, Geislingen/Steige (DE)

(73) Assignee: e.solutions GmbH (DE)

( * ) Notice: Subject to any disclaimer, the term of this patent is extended or adjusted under 35 U.S.C. 154(b) by 0 days.

(21) Appl. No.: 15/184,287

(22) Filed: Jun. 16, 2016

(65) Prior Publication Data

US 2016/0373627 A1   Dec. 22, 2016

(30) Foreign Application Priority Data

Jun. 18, 2015 (DE) .................. 10 2015 007 830

(51) Int. Cl.
| | |
|---|---|
| *H04N 5/225* | (2006.01) |
| *G02B 13/16* | (2006.01) |
| *G02B 27/00* | (2006.01) |
| *G02B 7/02* | (2006.01) |
| *G02B 3/12* | (2006.01) |

(52) U.S. Cl.
CPC ............ *H04N 5/2254* (2013.01); *G02B 3/12* (2013.01); *G02B 7/025* (2013.01); *G02B 27/0006* (2013.01)

(58) Field of Classification Search
CPC .. H04N 5/2254; H04N 5/2253; H04N 5/2257; H04M 1/0264; H04M 1/026; H04M 1/0295; H04M 1/0266; G02B 13/001; G02B 27/0006; G02B 3/12; G02B 7/025; G06K 9/209; G06F 1/1686; H01L 27/14618; H01L 27/14634; H01L 25/00; H05K 1/00

USPC .......................................................... 348/374
See application file for complete search history.

(56) References Cited

U.S. PATENT DOCUMENTS

| | | | | |
|---|---|---|---|---|
| 4,929,070 | A * | 5/1990 | Yokota | ............... G02B 6/0008 385/117 |
| 7,995,272 | B2 | 8/2011 | Bratt et al. | |
| 8,610,822 | B2 | 12/2013 | Weber et al. | |
| 9,829,698 | B2 * | 11/2017 | Haraguchi | ........... G02B 23/243 |

(Continued)

FOREIGN PATENT DOCUMENTS

| | | |
|---|---|---|
| DE | 10237481 | 1/2004 |
| DE | 10342837 | 4/2005 |

(Continued)

*Primary Examiner* — Chia-Wei A Chen
(74) *Attorney, Agent, or Firm* — Tarolli, Sundheim, Covell & Tummino LLP

(57) ABSTRACT

An optical assembly is described. The optical assembly comprises a transparent front cover, a lens having a lens surface facing the front cover, wherein the lens surface is designed to be essentially planar and has a central region and a transparent medium. The optical assembly optically couples at least the central region of the lens surface extensively to the front cover by the fact that the refractive index of the transparent medium differs from the refractive index of the front cover and the refractive index of a segment of the lens adjacent to the lens surface by less than 0.5. Furthermore, an electronic device having the optical assembly, a motor vehicle comprising the electronic device and a method for manufacturing the optical assembly are described.

17 Claims, 5 Drawing Sheets

(56) References Cited

U.S. PATENT DOCUMENTS

| | | | | |
|---|---|---|---|---|
| 2006/0028535 A1* | 2/2006 | Sakurai | ................ | B41J 2/45 347/238 |
| 2006/0034002 A1 | 2/2006 | Troxell et al. | | |
| 2007/0221826 A1* | 9/2007 | Bechtel | ................ | G02B 3/005 250/208.1 |
| 2008/0170299 A1* | 7/2008 | Kawabata | ............ | G02B 3/0056 359/665 |
| 2008/0267603 A1* | 10/2008 | Jung | ................ | G02B 3/14 396/111 |
| 2009/0002853 A1* | 1/2009 | Yuan | ................ | G02B 7/021 359/819 |
| 2009/0180198 A1* | 7/2009 | Lee | ................ | G02B 3/14 359/666 |
| 2009/0209675 A1* | 8/2009 | Khandal | ............ | C08F 230/04 522/81 |
| 2009/0218034 A1* | 9/2009 | Kawabe | ............ | G02F 1/133502 156/99 |
| 2010/0033830 A1* | 2/2010 | Yung | ................ | G02B 3/00 359/630 |
| 2010/0232037 A1* | 9/2010 | Do | ................ | G02B 7/028 359/713 |
| 2012/0019938 A1* | 1/2012 | Yamada | ............ | B29C 43/02 359/797 |
| 2012/0068615 A1* | 3/2012 | Duong | ................ | A01G 7/045 315/192 |
| 2012/0205766 A1* | 8/2012 | Takachi | ............ | G02B 5/282 257/432 |
| 2012/0206641 A1* | 8/2012 | Baba | ................ | G02B 13/0045 348/360 |
| 2012/0262053 A1* | 10/2012 | Tsuji | ................ | H01L 51/5275 313/498 |
| 2013/0051785 A1* | 2/2013 | Pope | ................ | G03B 17/02 396/535 |
| 2013/0240714 A1* | 9/2013 | Higashitsutsumi | .... | G02B 5/201 250/208.1 |
| 2013/0329026 A1* | 12/2013 | Hida | ................ | A61B 1/04 348/65 |
| 2014/0155694 A1* | 6/2014 | Murata | ............ | G02B 23/243 600/109 |
| 2015/0086162 A1* | 3/2015 | Miyahara | ............ | G02B 23/2423 385/33 |
| 2015/0238069 A1* | 8/2015 | Osada | ................ | A61B 1/05 600/109 |
| 2015/0287756 A1* | 10/2015 | Ezoe | ................ | C09D 7/12 257/432 |
| 2015/0293281 A1* | 10/2015 | Ezoe | ................ | C09D 5/004 359/360 |
| 2015/0323708 A1* | 11/2015 | Hashimoto | ............ | G02B 7/021 359/718 |
| 2016/0178884 A1* | 6/2016 | Hanada | ................ | G02B 23/243 359/738 |
| 2016/0230943 A1* | 8/2016 | Shin | ................ | F21K 9/00 |

FOREIGN PATENT DOCUMENTS

| | | |
|---|---|---|
| DE | 102007039807 | 2/2009 |
| DE | 102013221704 | 4/2015 |
| WO | 2005113293 | 12/2005 |
| WO | 2007090576 | 8/2007 |

\* cited by examiner

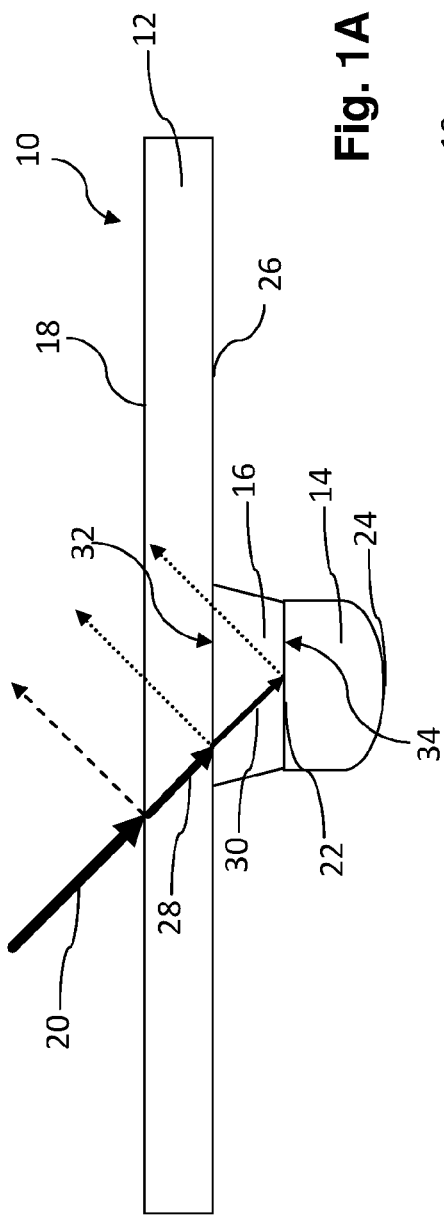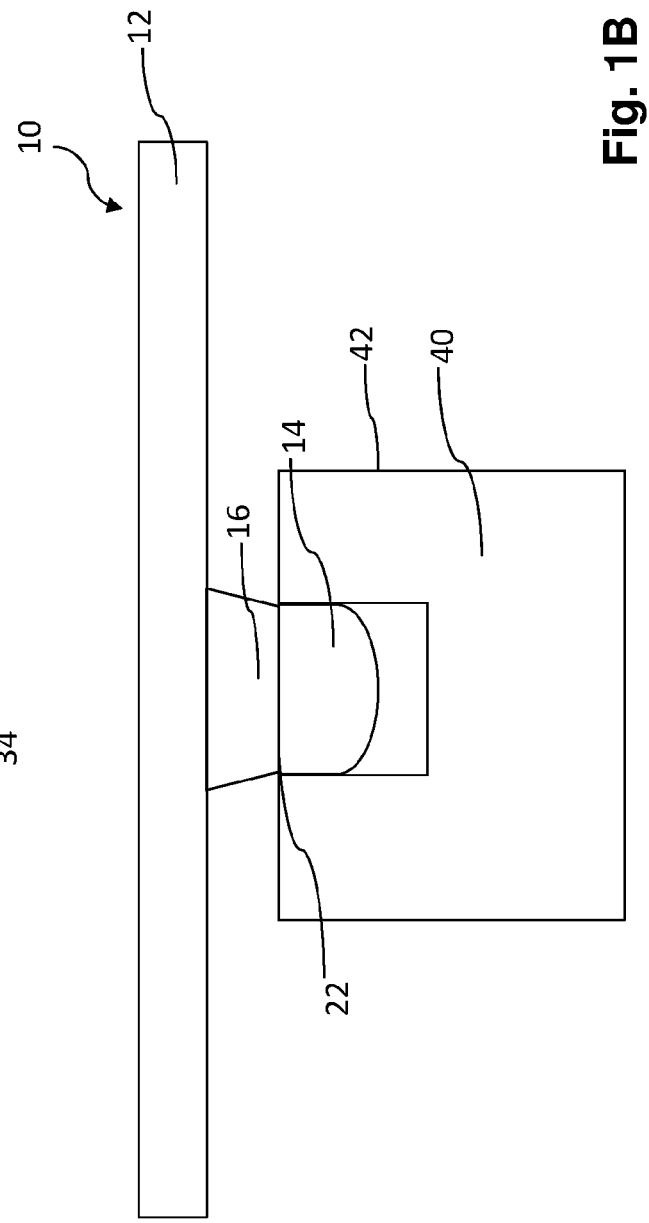

OPTICAL ASSEMBLY AND METHOD FOR MANUFACTURING SAME

CROSS-REFERENCE TO RELATED APPLICATION

The present application claims priority under 35 U.S.C. § 119 from German Patent Application No. 10 2015 007 830.5, filed 18 Jun. 2015, and entitled OPTICAL ASSEMBLY AND METHOD FOR MANUFACTURING SAME, which is incorporated herein by reference in its entirety.

TECHNICAL FIELD

The present disclosure relates in general to the technical field of optical assemblies. In particular it relates to an optical assembly having a covered lens and the method for manufacturing same.

BACKGROUND

In many fields of electronics, in particular in entertainment electronics and automotive electronics, optical assemblies having at least one lens are being used to an increasing extent. The lens is part of a camera module, for example, for receiving and further processing optical stationary images or moving images. Such camera modules are used in cell phones (smartphones), laptops and tablet computers, for example. Such camera modules are also used in automotive electronics, for example, to record images of the road surface or to enable occupants of the vehicle to conduct video calls or to make photographs of themselves (selfies) or of the surroundings.

Such optical assemblies typically include a transparent front cover, behind which is arranged the lens which is separated from the front cover by an air gap. Light falling through the front cover is reflected partially at the front cover-air interface and also at the air-lens interface. The unreflected portion of light passes through the lens and into the camera module, which includes the lens, for example. An optical sensor (e.g., a CCD sensor or a CMOS sensor) in the camera module then converts the light striking the sensor into electric signals. This requires (expensive) camera modules, which are designed to compensate for the loss of light due to the light reflection.

The front cover often forms a light inlet opening of an otherwise opaque surface. This opaque surface may be, for example, the frame of a display device of a cell phone, of a laptop computer or of a tablet computer. In order for light to be able to strike the lens and a camera module through the lens, an aperture (often circular or square) is provided in the opaque surface, but this has a negative effect on the visual appearance of the frame, which is otherwise visually homogeneous.

SUMMARY

An improved optical assembly and a method for manufacturing the optical assembly are to be made available.

According to a first aspect, an optical assembly is provided. The optical assembly includes a transparent front cover and a lens having a lens surface facing the front cover wherein the lens surface is designed to be essentially planar and has a central region. The optical assembly further includes a transparent medium which optically connects at least the central region of the lens surface to the front cover over the surface. The refractive index of the transparent medium deviates from the refractive index of the front cover and from the refractive index of a section of the lens adjacent to the lens surface by less than 0.5.

The refractive index of the transparent medium can differ from the refractive index of the front cover and from the refractive index of the section of the lens adjacent to the lens by less than approximately 0.3 (or, for example, less than approximately 0.2). It is possible to provide for the front cover and/or the section of the lens adjacent to the lens surface to be made of a traditional glass (for example, optical glass). As an alternative to this the front cover may be made of plastic, laminated glass or chemically prestressed glass. Furthermore, the lens may comprise plastic or crystalline materials. Depending on the material, the refractive index of the front cover and/or of the section of the lens adjacent to the lens surface may assume values between 1.3 and 1.8 (for example, approximately 1.5 for traditional glass).

The transparent medium may compromise a transparent adhesive which bonds at least the central region of the lens surface to the front cover. The transparent adhesive may be visually clear or colored (for example, to absorb infrared (IR) light). It may be provided that the transparent medium has a transparent liquid adhesive. As an alternative to this it is possible to provide that the transparent medium has a non-liquid adhesive layer (for example, in the form of a tape). Furthermore as an alternative or in addition to the transparent adhesive, the transparent medium may also comprise other components such as water, another liquid or optical filters, for example.

The central region of the lens surface may comprise a region of the lens surface which is determinative for the optical imaging properties of the lens. In this case, the region of the lens surface within which optical imaging defects of the lens are negligible may be determinative. It is possible to provide that the lens surface is designed to be planar at least in the central region. Outside of the central region, the lens surface may be designed to be planar or may have a curvature.

Essentially, the transparent medium may optically couple a portion of or the entire lens surface (e.g., extensively) to the front cover. A region of the lens surface not coupled to the front cover may correspond to an edge region protruding away from the edge of the lens surface.

It is possible to provide that the front cover extends essentially parallel to the lens surface. A distance between the lens surface and the inside surface of the front cover facing the lens may be between 0.1 mm and 1.5 mm. Alternatively, it is possible to provide for an angle between the lens surface and the inside surface of the front cover to assume values between approximately 1° and approximately 60°.

The lens may be a focusing lens whose focus is adjustable without mechanical movement of the lens. The lens may correspond to one of a liquid lens, a liquid crystal lens and a polymer lens. At least in the case of such a focusing lens, the lens may have a plurality of segments having different refractive indices.

The assembly may further comprise a sensor which is designed for detecting light passing through the lens and striking the sensor. The sensor may be designed to convert the light striking the sensor into an electric signal. The sensor may be, for example, an image sensor (for example, a CCD sensor or a CMOS sensor) or an ambient light sensor (ALS).

The lens and the sensor may be provided as part of a camera module. The transparent medium may essentially provide optical coupling over an entire side of the camera module facing the front cover extensively to the front cover. It is also possible to provide for the camera module to have a housing and for the lens surface and a surface of the housing facing the front cover to be arranged essentially in the same plane. The distance between the plane in which the surface of the housing is arranged and the plane in which the lens surface is arranged may assume values between 0.05 mm and 0.25 mm. At least in this case the transparent medium may be adjacent to the lens surface and essentially to the entire surface of the housing facing the front cover. As an alternative to this it may be provided that the lens surface of the lens extends essentially over the entire surface of the camera module.

According to a second aspect, an electronic device is provided. The electronic device comprises the optical assembly presented herein. The electronic device may be, for example, a portable electronic device and in particular may be a Smartphone, a tablet computer or a laptop.

The electronic device may further comprise a display device. The display device may be designed, for example, as a liquid crystal display device, as an OLED or LED display device. A frame with a light inlet opening may be provided for the display device. The optical assembly may be arranged at least partially in the region of the light inlet opening of the frame. The transparent front cover of the optical assembly may form a section of a transparent front cover provided in front of the display device. As an alternative to this the front cover of the optical assembly may be used, for example, inside a recess in the transparent front cover which is provided by the display device.

According to a third aspect, a motor vehicle is provided. The motor vehicle comprises the electronic device presented herein. The motor vehicle may further comprise a mounting system for releasable accommodation of the electronic device. As an alternative to this the electronic device may be permanently installed in the vehicle, for example, in the area of the dashboard or the rear view mirror.

According to a fourth aspect, a method for manufacturing an optical assembly is provided. The optical assembly comprises a transparent front cover and a lens with a lens surface facing the front cover, wherein the lens surface is designed to be essentially planar and has a central region. The method comprises an optical coupling of at least the central region of the lens surface to the front cover by means of a transparent medium. The refractive index of the transparent medium therefore differs from the refractive index of the front cover and the refractive index of a portion of the lens adjacent to the lens surface by less than 0.5.

The surface optical coupling by means of the transparent medium may comprise (e.g., extensively) connecting at least the central region of the lens surface to the inside surface of the front cover. The transparent medium may be arranged without any air inclusion between an inside surface of the front cover facing the lens and the transparent medium and without an air inclusion between the transparent medium and at least the central region of the lens surface. Furthermore, extensively connecting may include a fastening by means of the transparent medium. In addition, the transparent medium (for example, liquid adhesive) may also be cured (for example, by means of UV light).

BRIEF DESCRIPTION OF THE DRAWINGS

Additional advantages, details and features of the solution described herein are derived from the following description of exemplary embodiments as well as the figures, in which:

FIGS. 1A to 1C show schematic diagrams of exemplary embodiments of an optical assembly;

DETAILED DESCRIPTION

Figure 1C:
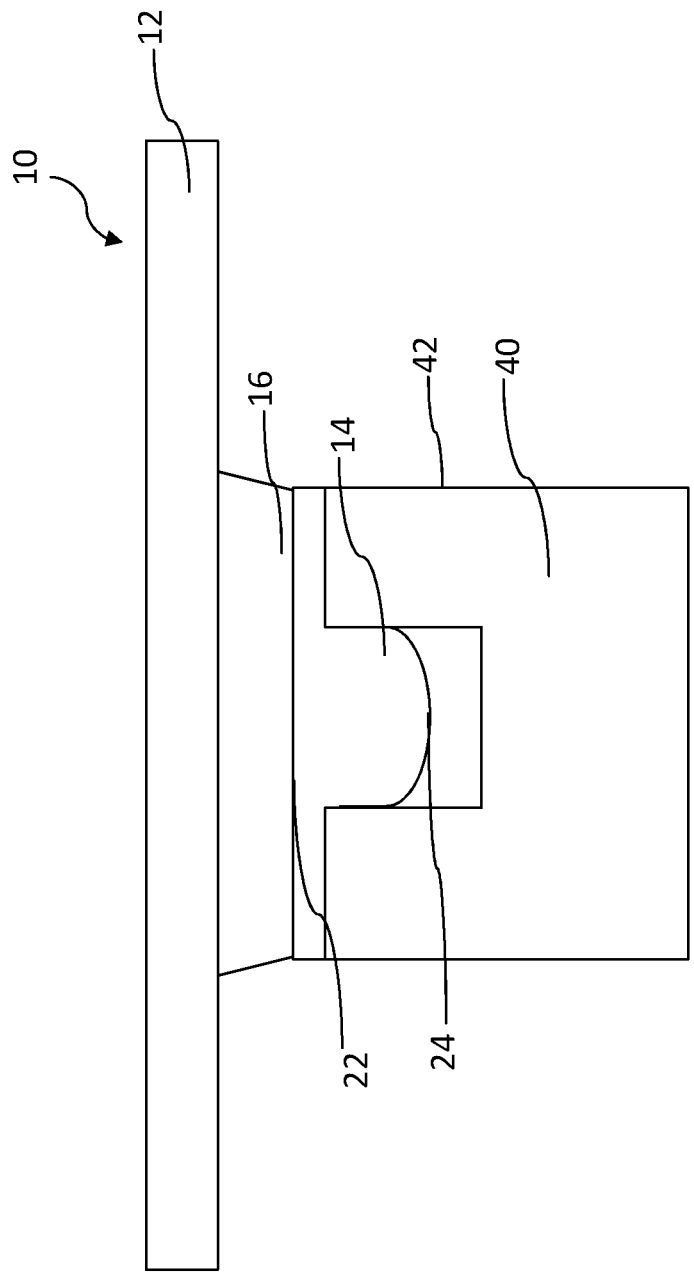

FIGS. 1A to 1C show exemplary embodiments of an optical assembly, labeled in general as 10. The optical assembly 10 comprises a transparent front cover 12, a lens 14 and a transparent medium 16 which optically couples the lens 14 to the transparent front cover 12 over the surface.

The front cover 12 shown in FIG. 1A is made of traditional glass in this exemplary embodiment. The front cover 12 has a refractive index of approximately 1.5. Light striking the outside surface 18 of the front cover 12 from the air (diagramed schematically with the arrow labeled as 20) is reflected partially on the outside surface 18 of the front cover 12 (indicated by the arrow shown with dotted lines).

The amount of reflected light is determined from the deviation of the refractive index of air (1.0) from the refractive index of the front cover 12.

In another exemplary embodiment, the front cover 12 may be made of plastic (e.g., polycarbonate, polyethylene terephthalate or polymethyl methacrylate), laminated glass or chemically prestressed glass, for example. In this case, the refractive index of the front cover 12 may be different from 1.5 and this causes a change in the reflection property of the incident light 20 according to the Fresnel equations.

The lens 14 according to FIG. 1A is designed to be planar convex. The lens 14 comprises a planar first lens surface 22, which is arranged facing the front cover 12, and a convex second lens surface 24 which is arranged facing away from the front cover 12. As an alternative to this the lens 14 may further be designed to be planar concave or strictly planar (with two parallel lens surfaces 22, 24).

The first lens surface 22 in the exemplary embodiment shown in FIG. 1A is arranged parallel to the inside surface 26 of the front cover 12 facing the lens 14. The distance between the first lens surface 22 and the inside surface 26 of the front cover 12 amounts to approximately 0.5 mm. In another exemplary embodiment, the distance may assume, for example, a value which is different from 0.5 mm and is between 0.1 mm and 1.5 mm, in particular between 0.3 mm and 1.2 mm. Furthermore, it is also possible to provide for the first lens surface 22 not to be arranged parallel to the inside surface 26. The angle between the first lens surface 22 and the inside surface 26 may assume a value of 10° in this case, for example. As an alternative to this the angle may also assume some other value between 1° and 60°, in particular between 1° and 20°.

The embodiment shown in FIG. 1A is a lens 14 manufactured from optical glass. The lens 14 has a refractive index of approximately 1.5. In another exemplary embodiment it is possible to provide that the lens 14 is a focusing lens whose focus is adjustable without mechanical movement of the lens 14. To do so, for example, a liquid lens, a liquid crystal lens or a polymer lens may be provided. Such a focusing lens may comprise a plurality of components (for example, a layer containing a plurality of liquids in the case of a liquid lens) whose refractive indices are different. In this case, at least one section of the lens 14 (made of optical glass, for example) adjacent to the first lens surface 22 may have a refractive index of approximately 1.5. Furthermore, the other ones of the plurality of components may have a refractive index which deviates by less than 0.5 (e.g., less than 0.2) from the refractive index of the segment adjacent to the first lens surface 22.

The transparent medium 16 is arranged over the surface between the lens 14 and the front cover 12 so that it is essentially adjacent to the entire first lens surface 22 as well as the inside surface 26 of the front cover 12 and fills up the space in between. In the exemplary embodiment illustrated in FIG. 1A, no air is enclosed between the first lens surface 22 and the transparent medium 16 or between the transparent medium 16 and the inside surface 26 of the front cover 12.

In another exemplary embodiment it is possible to provide that the transparent medium 16 is adjacent only to a central region of the first lens surface 22 or that the transparent medium 16 is adjacent only to a central region of the first lens surface 22 without any air inclusion. The central region may be, for example, a region of the first lens surface 22 which is determinative for the imaging properties of the lens 14 and/or in which imaging defects of the lens 14 are minimized. The central region of the first lens surface 22 may extend, for example, from an optical axis of the lens 14 over a value between ½ and ⅘ (e.g., ⅔) of the distance to one edge of the first lens surface 22.

The transparent medium 16 in the exemplary embodiment shown in FIG. 1A is an adhesive layer. The adhesive layer comprises an optically clear liquid adhesive. This is, for example, a silicone adhesive comprising two or more components. The liquid adhesive has a refractive index of approximately 1.4. After applying the liquid adhesive between the lens 14 and the front cover 12, the liquid adhesive is cured by storage or by means of UV light. When the liquid adhesive is cured by storage over a period of approximately 24 hours (or a longer period of time) at room temperature (approximately 20°), the resulting bonding of the lens 14 and the front cover 12 is especially stress-free.

In another exemplary embodiment, the liquid adhesive may only be transparent for a limited wavelength range. For example, the liquid adhesive may be designed (e.g., colored) for absorption of IR light. Furthermore the adhesive layer may also be provided in a non-liquid form, for example, as a tape.

As an alternative or in addition to the adhesive layer, the optical assembly may comprise a different transparent medium 16 which couples the lens 14 to the front cover 12 over the surface. The transparent medium 16 may be liquid (e.g., water) or non-liquid. Furthermore, the transparent medium 16 may comprise, for example, a polarization filter or may be designed as a polarization filter.

The light passing through the front cover 12 (indicated schematically by the arrows labeled as 28 and 30) is reflected partially at the interface 32 between the inside surface 26 of the front cover 12 and the transparent medium 16 as well as at the interface 34 between the transparent medium 16 and the first lens surface 22 (each indicated by the dotted arrows). In the exemplary embodiment shown in FIG. 1A, the refractive index of the front cover 12 deviates from the refractive index of the transparent medium 16 by approximately 0.1. Furthermore, the refractive index of the transparent medium 16 differs from the refractive index of the lens 14 by approximately 0.1.

Due to the minor deviation of the aforementioned refractive indices in comparison with the deviation of the refractive index of air and that of the front cover 12, the portion of light reflected on the interfaces 32, 34 is reduced in comparison with the portion reflected on the outside surface 18 of the front cover 12. Furthermore, reduced light reflection is achieved within the optical arrangement 10 shown in FIG. 1A in comparison with an optical arranged having an air gap between the central region of the first lens surface 22 and the front cover 12, for example. This results in an improved light output of the optical arrangement 10 shown in FIG. 1A. Furthermore, due to the reduced light reflection described here, it is possible to omit one or more of the antireflection coatings in the optical arrangement 10 (e.g., on the first lens surface 22 and/or the front cover 12).

Depending on the exemplary embodiment, there may be variations in the refractive index of the front cover 12, the transparent medium 16 (e.g., the adhesive layer) and/or the segment of the lens 14 adjacent to the first lens surface 22 (i.e., the refractive index of the lens 14 in the exemplary embodiment shown in FIG. 1A). It is provided here that the refractive index of the transparent medium 16 deviates by less than 0.5, in particular less than 0.2 from the refractive index of the front cover 12 and from the segment of the lens 14 adjacent to the first lens surface 22.

As an alternative to the optical assembly 10 according to the exemplary embodiment shown in FIG. 1A, the optical assembly 10 shown in FIG. 1B comprises a camera module 40 which includes the lens 14. The camera module 40 is arranged in such a way that light passes through the lens 14 into the camera module 40.

The camera module 40 according to the exemplary embodiment shown in FIG. 1B comprises a housing 42 and a sensor device (not shown) for detecting incident light in the camera module 40 and on the sensor device. The sensor device may have an image sensor and/or an ambient light sensor. The image sensor and/or the ambient light sensor may be, for example, a CCD sensor or a CMOS sensor. The ambient light sensor may be designed as a photodiode or a photo-resistor as an alternative to this.

In addition to this, the camera module 40 may include other components (not shown) such as, for example, an adjusting device for adjusting the focus of the lens 14 (e.g., in the case of a liquid lens or a liquid crystal lens or a polymer lens). Furthermore in another exemplary embodiment it is also possible to provide that the lens 14 is designed as a component which is separate from the camera module 40.

In the exemplary embodiment shown in FIG. 1B, the camera module 40 is designed so that a surface of the housing 42 which faces the front cover 12 is arranged in the same plane as the first lens surface 22. As an alternative to this it is possible to provide that the plane in which the surface of the housing 42 facing the front cover 12 is arranged is at a distance from the plane in which the first lens surface 22 is arranged. In this case the distance between the surface of the housing 42 and the first lens surface 22 may assume, for example, values between 0.05 mm and 0.25 mm, in particular between 0.05 mm and 0.1 mm.

The transparent medium 16 optically couples the first lens surface 22 extensively to the front cover 12 in the exemplary embodiment shown in FIG. 1B. In another exemplary embodiment it is possible to provide that the transparent medium 16 will additionally optically couple the surface of the housing 42 facing the front cover 12 partially or totally to the front cover 12.

In deviation from the exemplary embodiment shown in FIG. 1B, the lens 14 of the optical assembly 10 of the exemplary embodiment shown in FIG. 1C has a first lens surface 22 extending over the entire surface of the housing 42 facing the front cover 12. The second lens surface 24 has a planar segment in the region of the surface of the housing 42 facing the front cover 12 and has a convex section which protrudes into the interior of the camera module 40. The segment of the second lens surface 24 protruding into the interior of the camera module 40 may also as an alternative to this be designed to be planar or concave.

In the exemplary embodiment shown in FIG. 1B, the transparent medium 16 optically couples the entire first lens surface 22 extensively to the front cover 12. In another exemplary embodiment, it is possible to provide that the transparent medium 16 optically couples only a segment of the first lens surface 22 to the front cover. For example, it is possible to provide that the transparent medium 16 optically couples only a central region of the first lens surface 22 to the front cover 12.

Figure 2A:
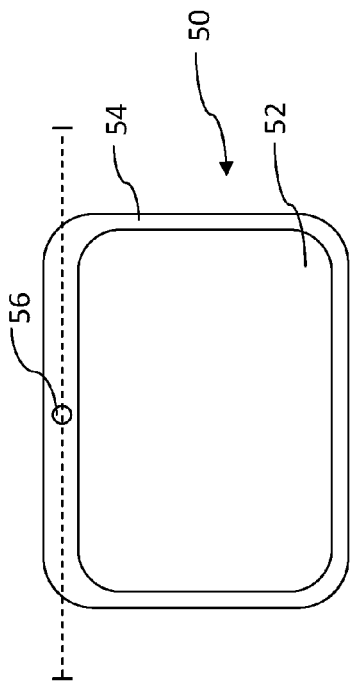
FIGS. 2A to 2C show schematic diagrams of exemplary embodiments of an electronic device with the optical assembly.
Figure 2B:
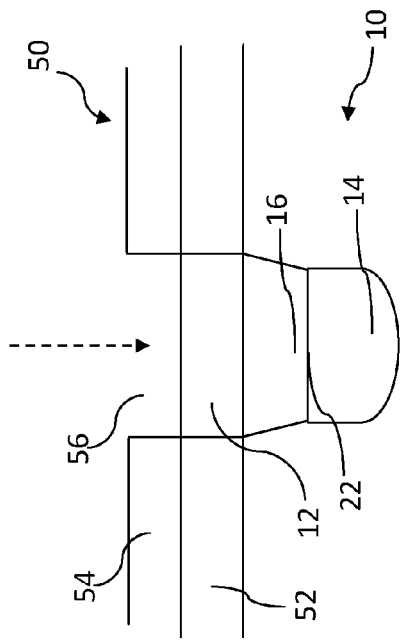
Figure 2C:
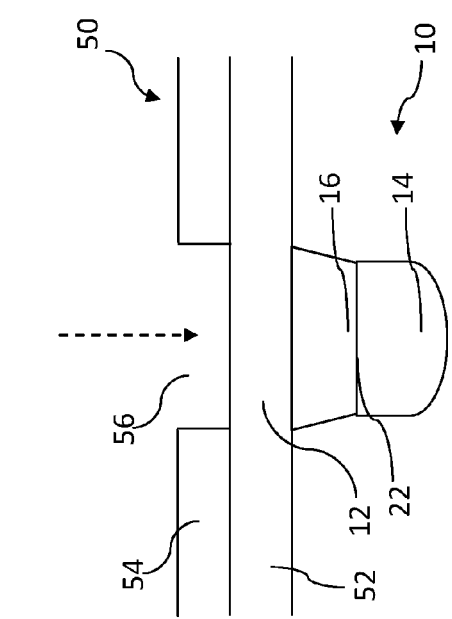

FIGS. 2A to 2C show exemplary embodiments of an electronic device, labeled as 50 in general. The electronic device 50 may be in general a mobile terminal such as a cell phone (Smartphone), a tablet computer or an E-book reader. In other exemplary embodiments, this electronic device may be a permanently installed electronic device 50. The electronic device 50 may be permanently installed in a motor vehicle, for example, or detachably mountable by means of a mounting system provided in the motor vehicle.

FIG. 2A shows a top view of the electronic device 50 from the front. The electronic device 50 comprises a display device 52 which is arranged on the front side and is enclosed in a frame 54. The display device 52 may be a liquid crystal panel, an OLED panel, an LED panel or some other suitable display system (for example, an E-paper display device). The display device 52 may be used for display of data, for example, in the form of stationary images (e.g., photos), moving images (e.g., videos) and/or text. It is also possible to provide for the display device 52 to include a touch-sensitive or presence-sensitive display screen, for example, in the manner of a touch screen for capturing gestures. As an alternative to this, for example, buttons, switches or other mechanical operating elements may also be included with the electronic device 50 (for example, arranged on the frame 54).

The frame 54 is designed to be essentially opaque (e.g., by pigmentation). The frame 54 has a light inlet opening 56. In the exemplary embodiment shown in FIG. 2A, the light inlet opening 56 is arranged in a segment of the frame 54 situated above the display device 12. As an alternative to this, the light inlet opening 56 may be arranged in another segment of the frame 54 on the front side of the electronic device 50. For example, it is possible to provide that the light inlet opening 56 corresponds to a passage (e.g., oval or polygonal shaped) in the frame 54 or a transparent segment (e.g., optically clear) of the frame 54. This transparent segment may then function as a transparent cover.

FIGS. 2B and 2C show a detail of a sectional view of the electronic device 50 along the dashed sectional line marked with I in FIG. 2A. The optical assembly 10 according to the exemplary embodiment shown in FIG. 1A is arranged behind the light inlet opening 56 in the frame 54, as seen in the light inlet direction, which is indicated by the arrow shown with a dashed line. In another exemplary embodiment, for example, the optical assembly 10 may be provided in the electronic device 50 according to one of the exemplary embodiments illustrated in FIGS. 1B and 1C. In this case, the optical assembly 10 may be arranged at least partially in the region of the light inlet opening 56. For example, it is possible to provide that at least one central region of the first lens surface 22 is arranged behind the light inlet opening 56 in the frame 54, as seen in the direction of admission of light.

In the exemplary embodiment shown in FIG. 2B, the transparent front cover 12 of the optical assembly is provided as a segment of the display device 52 of the electronic device 50. In contrast with that, the transparent front cover 12 according to the exemplary embodiment shown in FIG. 2C is inserted as a separate component into a recess in the display device 52.

In the exemplary embodiments of the electronic device 50 shown in FIGS. 2B and 2C, the diameter of the light inlet opening 56 is designed to be larger than the diameter of the first lens surface 22. Depending on the design of the lens 14, in another exemplary embodiment it is also possible to provide only that the diameter of the light inlet opening 56 is designed to be larger than the central region of the first lens surface 22. The diameter of the light inlet opening 56 may assume values between approximately 0.5 mm and 5 mm, for example.

Due to the small distance between the front cover 12 and the lens 14 (as described with reference to the embodiments shown in FIGS. 1A to 1C), the size of the light inlet opening 56 may be designed to be reduced in comparison with typical optical assemblies, in which a greater and/or variable distance (e.g., for adjusting the focus of the lens) is provided between the front cover 12 and the lens 14.

Figure 3:
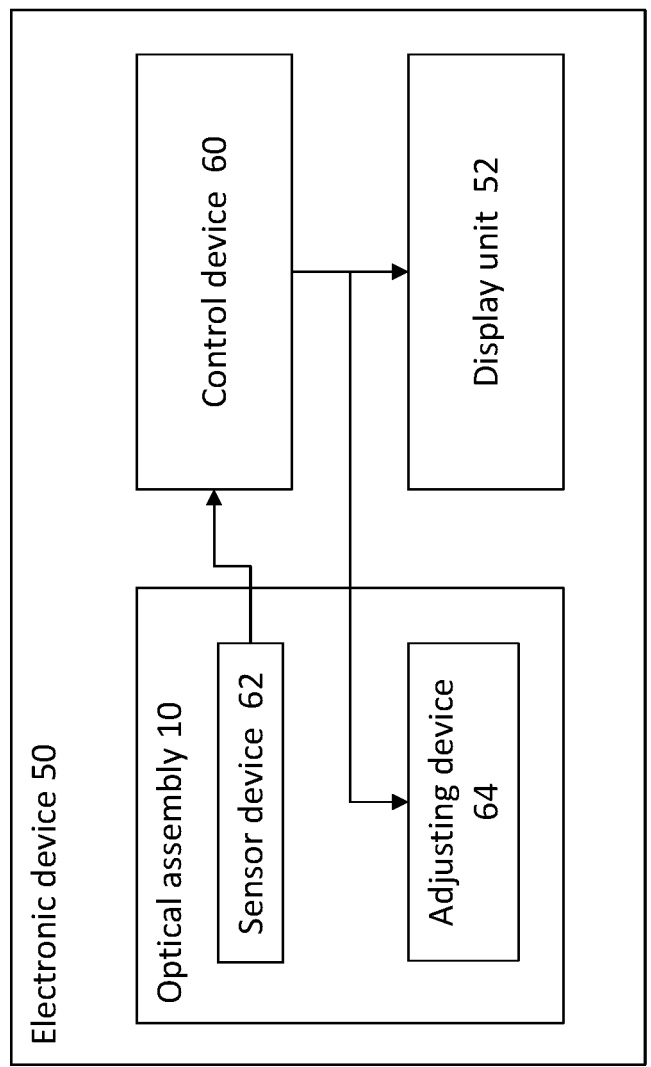
FIG. 3 shows a block diagram of an exemplary embodiment of an electronic device with the optical assembly.

FIG. 3 shows in a block diagram an embodiment of an electronic device 50. This may be the electronic device 50 that was described with respect to FIGS. 2A to 2C. The electronic device 50 comprises the optical assembly 10 (as described with reference to FIGS. 1A to 2C), a control device 60 and a display device 52 (as described with respect to FIGS. 2A to 2C).

In the exemplary embodiment shown in FIG. 3, the optical assembly 10 comprises a sensor device 62 and an adjusting device 64. This may be the sensor device and adjusting device explained (but not shown) with reference to FIGS. 1A to 1C. The sensor device 62 is designed to convert light striking sensor device 62 into an electric signal. The control device 60 is electrically connected to the sensor device 62. In the exemplary embodiment shown in FIG. 3, the control device 60 is designed to receive the electric signal generated by the sensor device 62. The control device 60 is further designed to control the adjusting device 64 for adjusting the focus of the lens 14 encompassed by the optical assembly 10 (cf. FIGS. 1A to 1C, 2B to 2C). In addition to this, the control device 60 may further be designed for controlling the sensor device 62 and/or additional elements (not shown) of the optical assembly (e.g., an aperture). The control device 60 may correspond to a processor (e.g., a CPU) of the electronic device 50 or may at least include a processor of the electronic device 50.

The control device 60 is designed to control the display device 52 for display of digital image information generated on the basis of the electric signal received from the sensor device 62 (e.g., by means of an image sensor). The control device 60 may further be designed to adapt a display brightness of the display device 52 on the basis of the ambient brightness information generated by the sensor device 62 (e.g., by means of an ambient light sensor).

Figure 4:
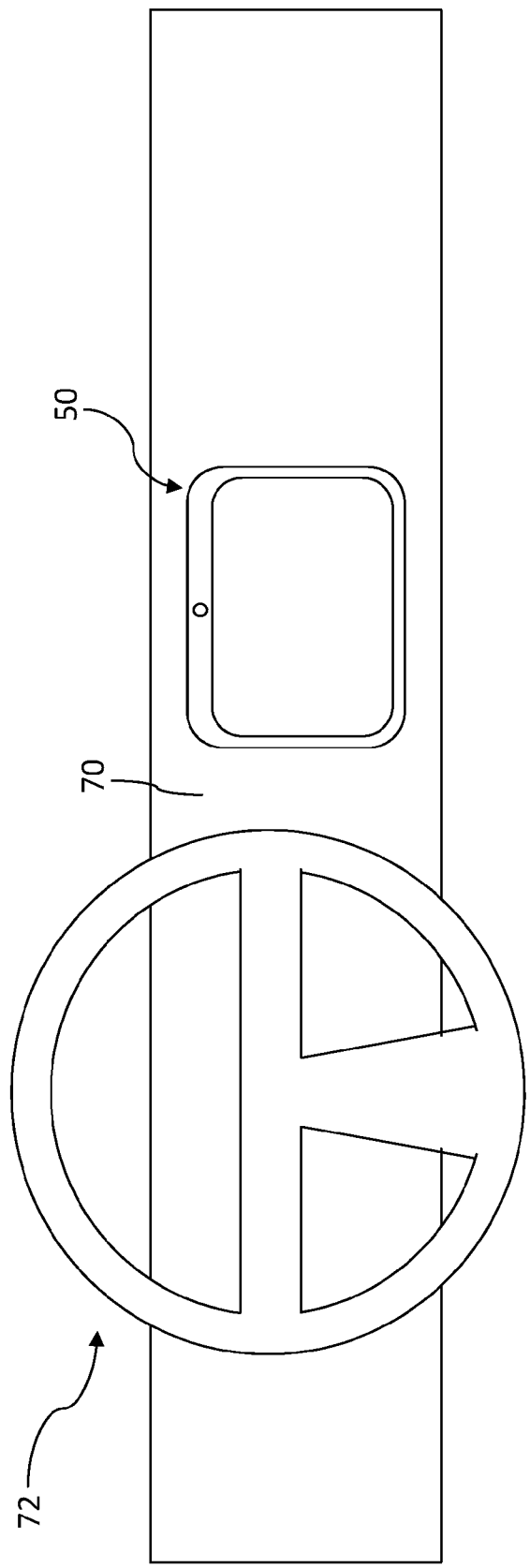
FIG. 4 shows a schematic diagram of an exemplary embodiment of a motor vehicle with the electronic device.

FIG. 4 shows a frontal view of a dashboard 70 in a motor vehicle, labeled as 72 in general. The motor vehicle 72 comprises the electronic device 50 described with respect to FIGS. 2A to 3. In the exemplary embodiment shown here the electronic device 50 is mounted in the dashboard 70 in the region of the central console. As an alternative to this, the electronic device 50 may be mounted, for example, on the rear side of the driver's seat and/or a passenger seat in the motor vehicle 72. Furthermore, it is also possible to provide that the electronic device 50 is designed as a portable device. In this case a mounting system (integrated into the dashboard 70, for example, may be provided for releasable accommodation of the electronic device 50.

As an alternative or in addition to the electronic device 50 shown in FIG. 4, the motor vehicle 72 may have, for example, an electronic device designed as a camera apparatus. It is possible to provide that the camera apparatus comprises the optical assembly 10 as described with reference to FIGS. 1A to 1C, as well as the respective control and/or evaluation devices which belong with it if necessary. The camera device may be, for example, integrated into a rear view mirror or the outer body of the motor vehicle 72.

The exemplary embodiments described here provide various features of an optical assembly and an electronic device that comprises the optical assembly. In a different exemplary embodiment, these features may be combined or modified in any way.

The invention claimed is:

1. An optical assembly, comprising:
    a transparent front cover having a light incident surface;
    a lens having a lens surface facing a surface of the front cover opposite to the light incident surface, wherein the lens surface is designed to be planar and has a central region;
    a transparent medium which optically couples at least the central region of the lens surface to the front cover by the refractive index of the transparent medium differing from the refractive index of the front cover and from the refractive index of a segment of the lens adjacent to the lens surface by less than 0.5; and
    a sensor which is designed for detecting incident light passing through the transparent front cover, then passing through the lens and then striking the sensor, the lens and the sensor being part of a camera module, wherein the camera module has a housing, and wherein the lens surface and a surface of the front housing facing the front cover are arranged in the same plane.

2. The optical assembly according to claim 1, wherein the refractive index of the transparent medium differs from the refractive index of the front cover and from the refractive index of the segment of the lens adjacent to the lens surface by less than 0.3.

3. The optical assembly according to claim 1, wherein the transparent medium comprises a transparent adhesive which bonds at least the central region of the lens surface to the front cover.

4. The optical assembly according to claim 3, wherein the transparent medium comprises a transparent liquid adhesive.

5. The optical assembly according to claim 1, wherein the central region comprises a region of the lens surface which is determinative for the optical imaging properties of the lens.

6. The optical assembly according to claim 1, wherein the transparent medium optically couples the entire lens surface extensively to the front cover.

7. The optical assembly according to claim 1, wherein the front cover extends parallel to the lens surface.

8. The optical assembly according to claim 7, wherein a distance between the lens surface and the side of the front cover facing the lens is between 0.1 mm and 1.5 mm.

9. The optical assembly according to claim 1, wherein the lens is a focusing lens whose focus is adjustable without any mechanical movement of the lens.

10. The optical assembly according to claim 9, wherein lens is one of a liquid lens, a liquid crystal lens or a polymer lens.

11. The optical assembly according to claim 1, wherein the transparent medium optically couples an entire side of the camera module facing the front cover to the front cover.

12. An electronic device comprising an optical assembly according to claim 1.

13. The electronic device according to claim 12, further comprising a display device wherein a frame with a light inlet opening is provided for the display device and the optical assembly is arranged at least partially in the region of the light inlet opening in the frame.

14. The electronic device according to claim 12, further comprising a display device wherein the transparent front cover of the optical assembly forms a segment of a transparent front cover provided in front of the display device.

15. A motor vehicle, comprising an electronic device according to claim 12.

16. An optical assembly, comprising:
    a transparent front cover having a light incident surface;
    a lens having a lens surface facing a surface of the front cover opposite to the light incident surface, wherein the lens surface is designed to be planar and has a central region;
    a transparent medium which optically couples at least the central region of the lens surface to the front cover by the refractive index of the transparent medium differing from the refractive index of the front cover and from the refractive index of a segment of the lens adjacent to the lens surface by less than 0.5; and
    a sensor which is designed for detecting incident light passing through the transparent front cover, then passing through the lens and then striking the sensor, the lens and the sensor being part of a camera module, wherein the lens surface of the lens extends over the entire surface of the camera module facing the front cover.

17. A method for manufacturing an optical assembly, comprising a transparent front cover having a light incident surface and a lens with a lens surface facing the front cover opposite to the light incident surface, wherein the lens surface is designed to be planar and comprises a central region, wherein the method comprises:
    optically coupling of at least the central region of the lens surface to the front cover by means of a transparent medium by the refractive index of the transparent medium differing by less than 0.5 from the refractive index of the front cover and from the refractive index of a segment of the lens which is adjacent to the lens surface,
    providing a sensor which is designed for detecting incident light passing through the transparent front cover, then passing through the lens and then striking the sensor, the lens and the sensor forming part of a camera module, wherein the camera module has a housing, and wherein the lens surface and a surface of the housing facing the front cover are arranged in the same plane.

* * * * *